May 11, 1943.                C. M. YODER                2,318,732
MACHINE FOR OPERATING ON THE SIDE EDGES OF SHEET METAL STOCK
             Filed July 25, 1939         4 Sheets-Sheet 1

INVENTOR.
CARL M. YODER
BY
            ATTORNEY.

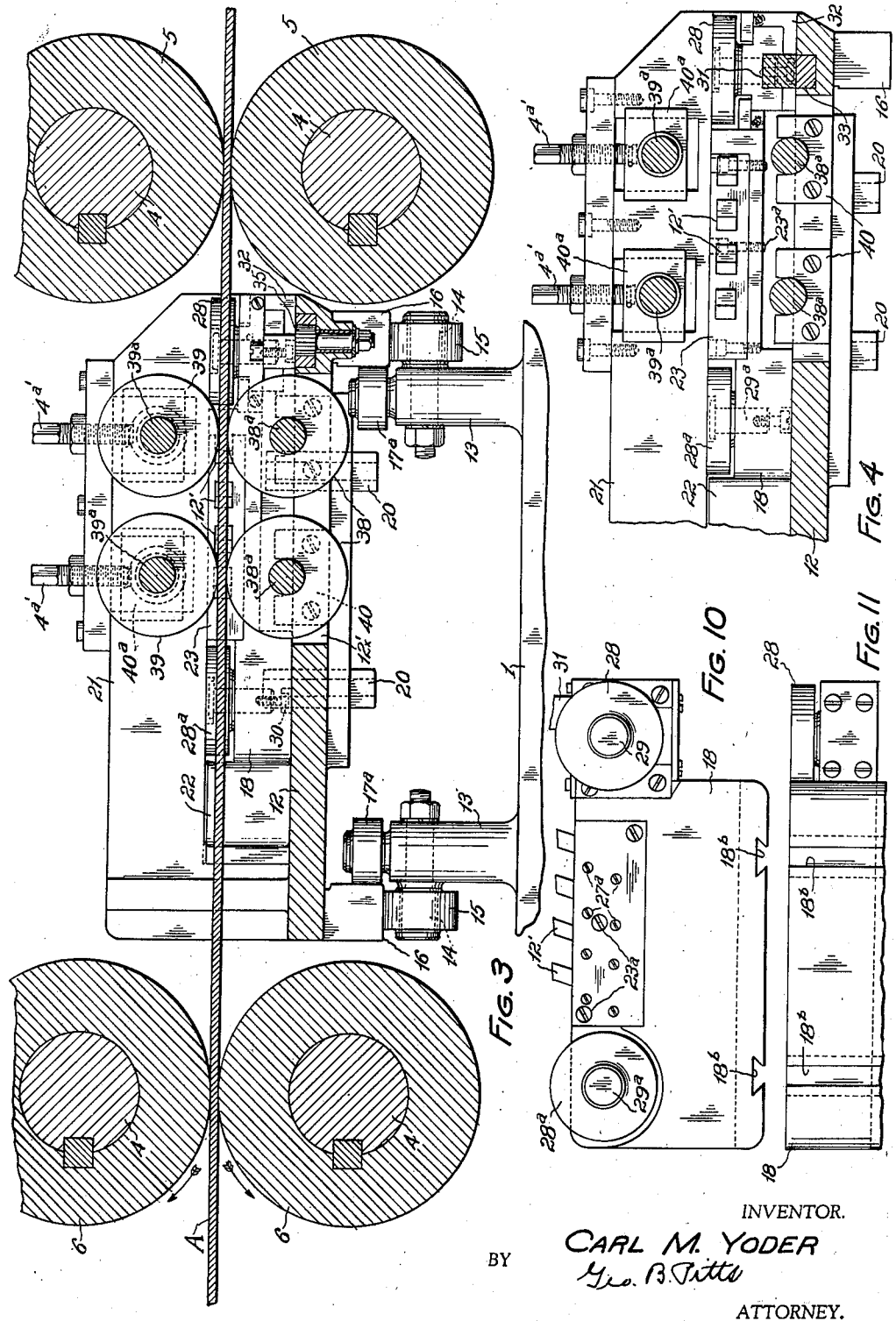

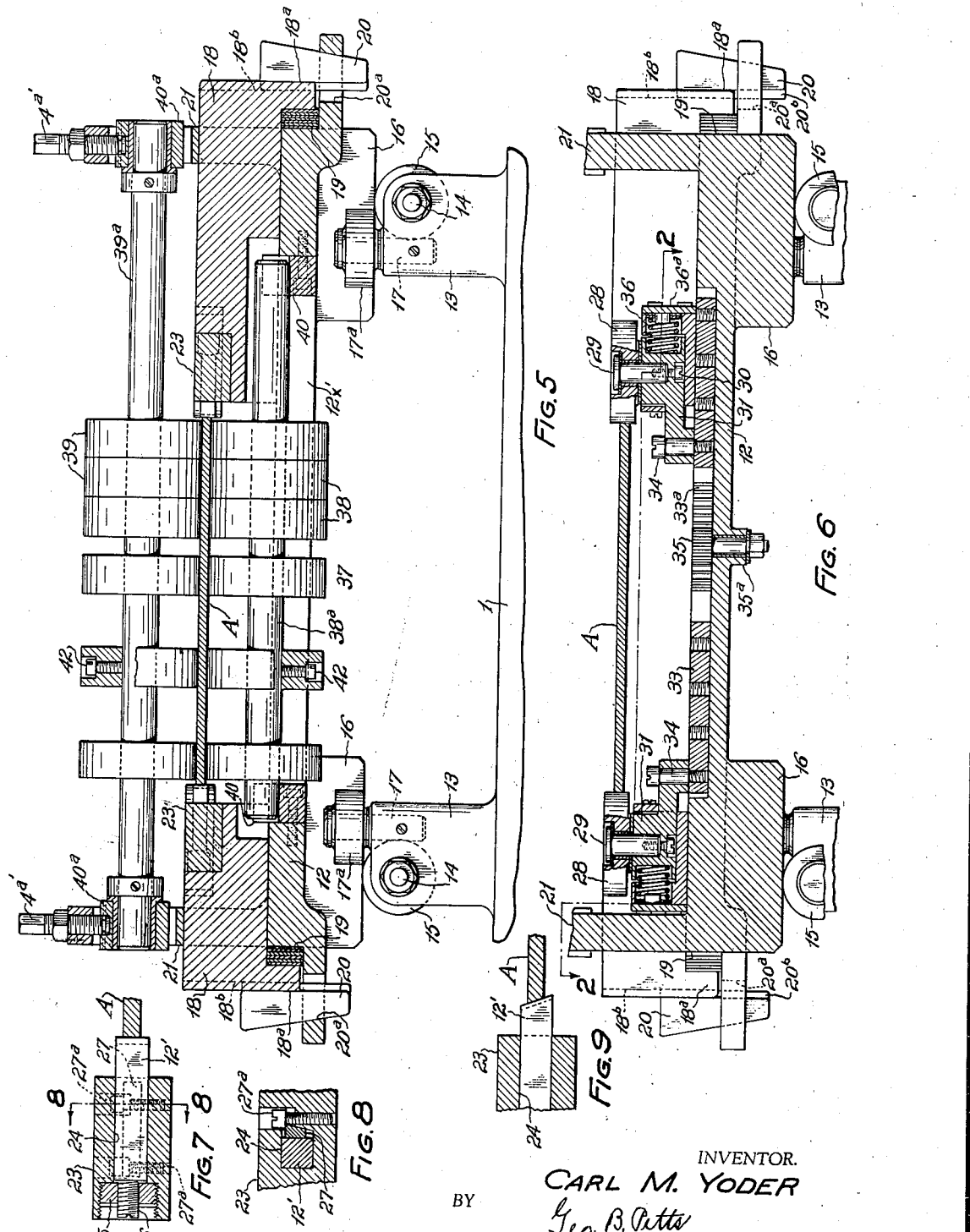

Patented May 11, 1943

2,318,732

UNITED STATES PATENT OFFICE 2,318,732

MACHINE FOR OPERATING ON THE SIDE EDGES OF SHEET METAL STOCK

Carl M. Yoder, Lakewood, Ohio

Application July 25, 1939, Serial No. 286,375

19 Claims. (Cl. 90—24)

This invention relates to a machine for cutting or planing the opposite edges of sheet metal stock as it comes from the mill. The stock is first trimmed to the desired width and thereafter, when desired, cut into strips of the desired width. The stock is fed to the machine, so that the cutting and planing hereinafter set forth, removes the rough edges resulting from the trimming and slitting, as well as conditions the edges for fabrication; for example, where the stock is shaped into tubular form and the edges are brought into opposed relation for welding purposes. The edges may be cut or planed so that the sides of the groove when the edges are brought into opposed relation may have any desired angularity. However, the edges may be planed on a line that is other than straight from face to face of the stock, according to the shape of the tool edges.

One object of the invention is to provide improved means for simultaneously cutting or planing both edges of sheet stock, mounted to compensate for camber which may be present in the strip.

Another object of the invention is to provide an improved machine of this type wherein means are provided for positioning or guiding the stock relative to the cutters so that where the stock varies in width the strain thereon or cutting action will be equalized, with the result that substantially the same amount of metal will be removed from opposite sides of the stock.

Other objects of the invention will be apparent to those skilled in the art to which my invention relates from the following description taken in connection with the accompanying drawings, wherein Fig. 1 is a plan view of a machine embodying my invention.

Fig. 3 is a fragmentary section on the line 3—3 of Fig. 1.

Fig. 4 is a fragmentary section on the line 4—4 of Fig. 2.

Figure 2:
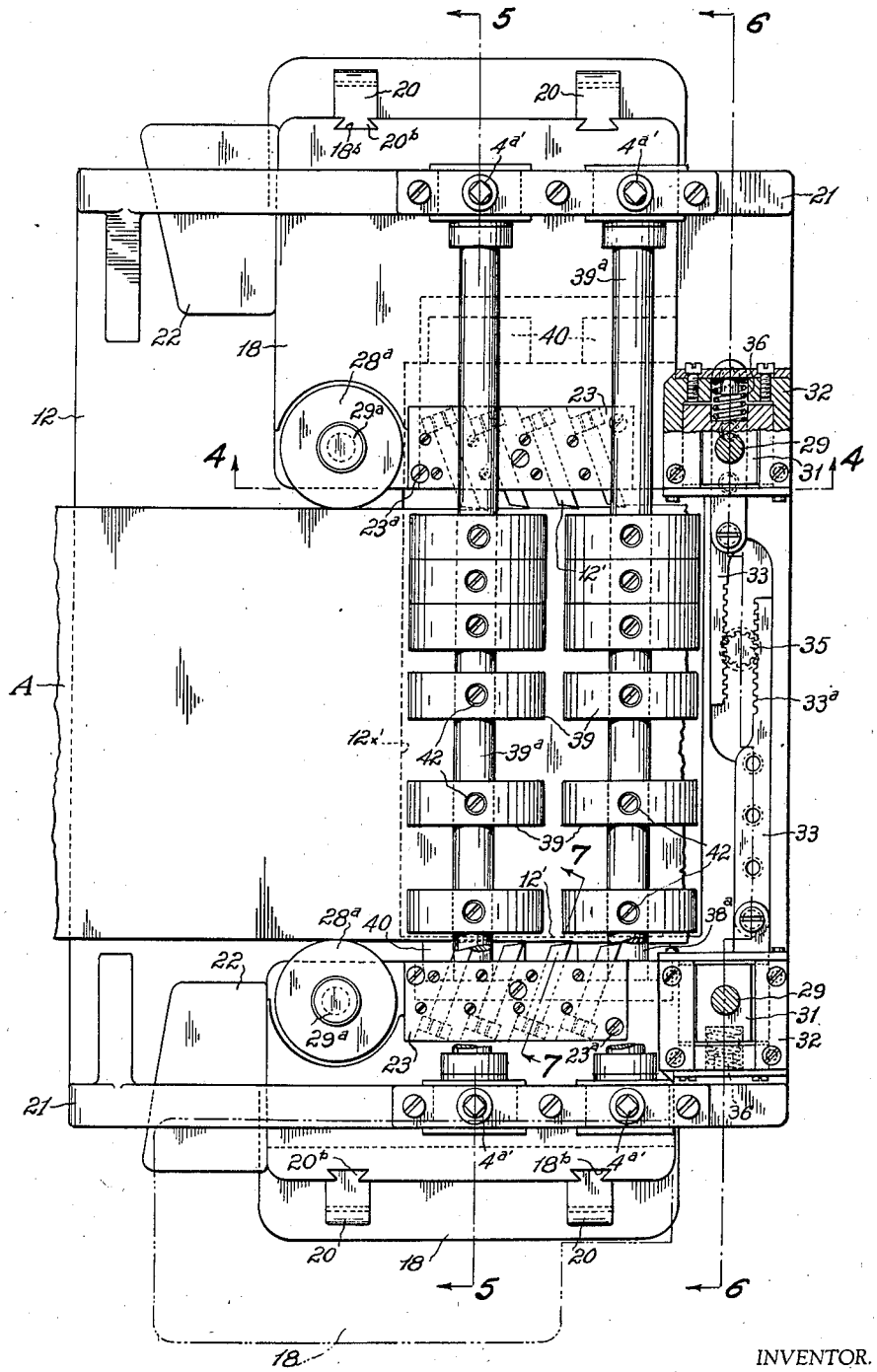
Fig. 2 is a fragmentary plan view of the parts shown in Fig. 1, enlarged, partly in section on the line 2—2 of Fig. 6.

Figs. 5, 6 and 7, are sections on the lines 5—5, 6—6 and 7—7, respectively, of Fig. 2.

Fig. 8 is a section on the line 8—8 of Fig. 7.

Fig. 9 is a fragmentary view substantially similar to Fig. 8, but showing a modification.

Fig. 10 is a plan view of one of the cutter holders, and the cutters therein, removed from the machine.

Fig. 11 is an elevational view of the parts shown in Fig. 10.

Figure 12:
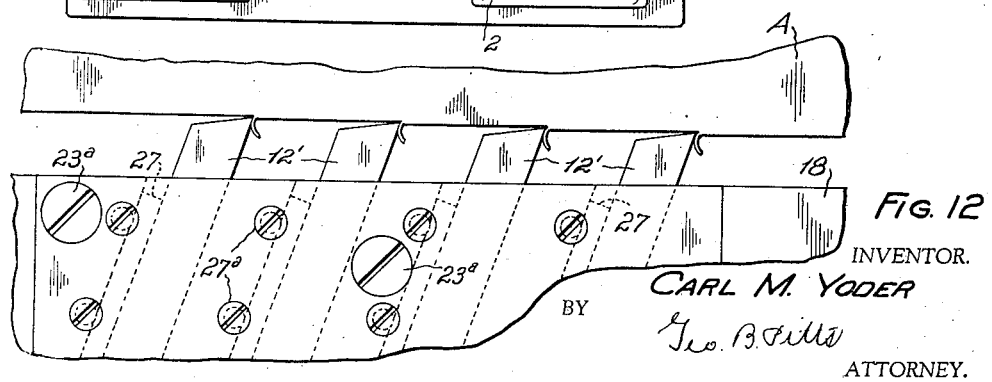

Fig. 12 is an enlarged fragmentary view showing the operation of the tools.

In the drawings, 1 indicates a support or base member on which are mounted front and rear pairs of standards 2, 3, supporting bearings for the shafts 4 of front and rear roll sets 5, 6. Each roll set comprises upper and lower rolls adapted to feed the stock A, which is supplied from any suitable source (not shown). The bearings for the upper roll shaft 4 of each roll set may be adjusted vertically in a well known manner by the screws 4a. Suitable means are provided for driving the roll shafts 4. The form of driving means shown consists in providing on corresponding ends of the shafts 4 for each roll set gears 7 in mesh (the gears on the upper shaft only being shown) and on the extended ends of the shafts 4 for the lower rolls sprockets 8 which are engaged by a chain 8a. The extended end for one lower roll shaft 4 (preferably the shaft for the lower front roll) is connected to a shaft 10, which is driven through a suitable gear reduction within a casing 10a, by a motor 11, the casing 10a and motor 11 being mounted on the base member 1.

12 indicates as an entirety a frame carrying sets of cutting or planing devices 12'; mounted to automatically float or slide laterally relative to the direction of feed of the stock A due to camber therein, whereby the sets of cutting devices, which have a fixed spaced relation, follow the side edges of the stock. To provide for this movement of the frame 12, the base member 1 is provided with four upright bosses 13, in each of which is mounted a stud shaft 14 disposed parallel to the direction of feed of the stock A and carrying a freely rotatable roller 15, arranged to be engaged by the bottom face of a wall 16 depending from the adjacent portion of the frame 12, and extending at right angles to the direction of feed of the material, the rollers 15 serving to support the frame 12 and permit it to move laterally in either direction. To prevent movement of the frame 12 longitudinally of the stock and to guide it on the rollers laterally, as well as to resist the pressure on the frame in the direction of the feed of the stock due to the engagement of the cutting devices therewith, each boss 13 is provided with a vertically disposed stud shaft 17 carrying at its upper end a freely rotatable roller 17a arranged to engage the inner side face of the adjacent wall 16, whereby the rollers 17a on the front bosses 13 co-operate with the rollers 17a on the rear bosses to maintain the frame in position while permitting it to move laterally.

Figure 1:
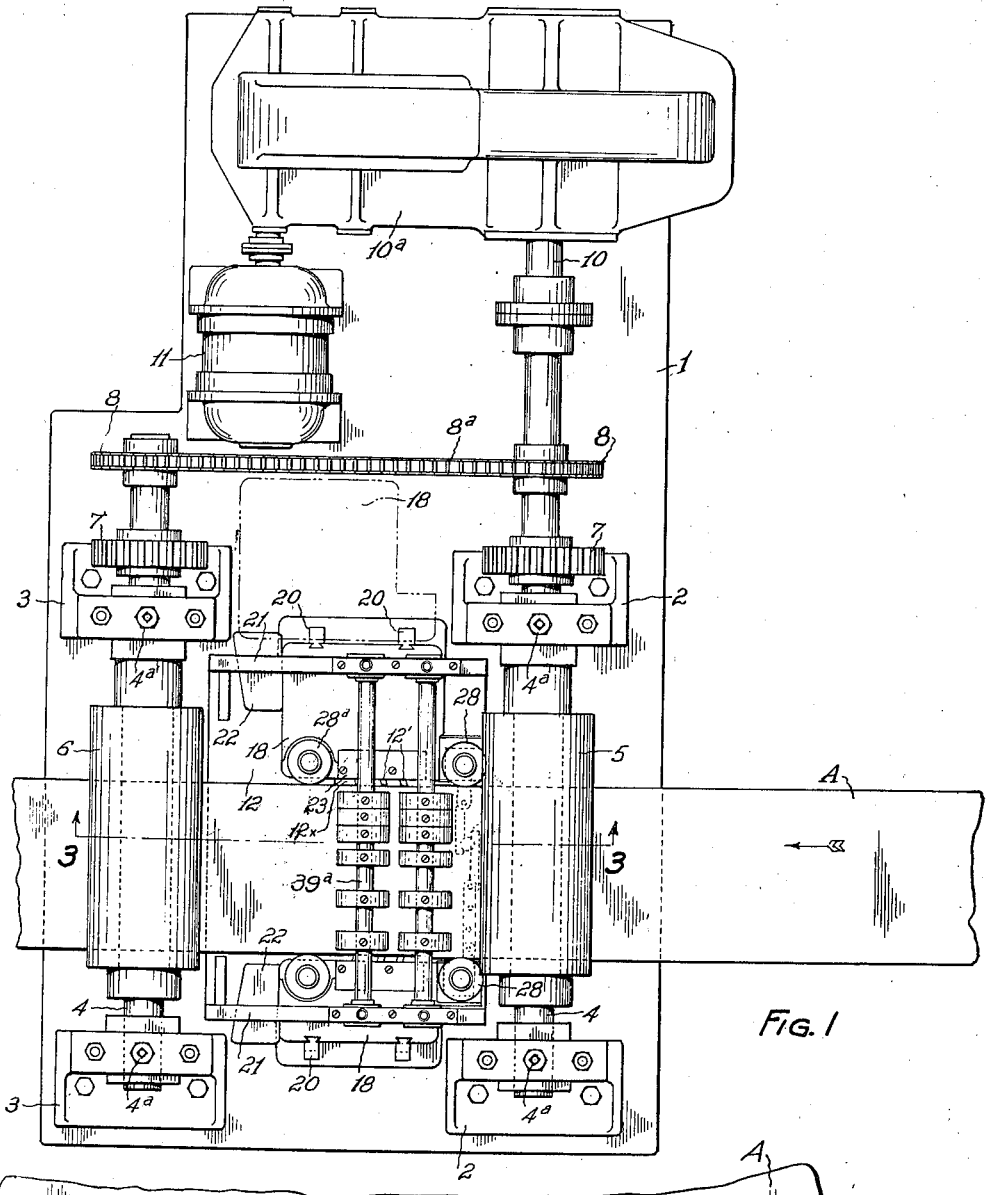

18 indicates a pair of members each removably and adjustably mounted on the frame 12 (see dotted lines in Figs. 1 and 2) and arranged to support one set of cutting devices 12'. The means for removably and adjustably securing each supporting member 18 in position on the frame 12 consist of the following: The lateral sides of the frame 12 are off-set or cut-away longitudinally (that is, on lines parallel to the direction of feed of the stock) to form shoulders 19 and the outer side of each supporting member 18 is provided with a depending flange 18a which is engaged by one or more wedges 20, the latter being projected into openings 20a formed in the frame 12, to force the flange toward or against the shoulder 19, or shims interposed between the flange and shoulder; the number of shims being increased or decreased to provide for a predetermined spacing of the edges of the sets of cutting devices 12'. In order to make the wedges effective between the flange 18a and outer sides of the adjacent openings 20a, the inner side of each wedge 20 is provided with a longitudinally extending dove-tailed tenon 20b slidably fitting a similarly shaped groove 18b on the outer side of the adjacent member. The frame 12 is provided along its opposite sides with integral bridges 21, the intermediate portions of which engage the supporting members 18 (see Figs. 3, 4 and 5) to hold them in engagement with the frame 12. Also, the rear end of each supporting member 18 is engaged by a wedge 22 engaging therewith and the rear end of the bridge member 21 to rigidly clamp it against the front end of the bridge member 21. By removing the wedges 20 and 22, which engage each supporting member 18, the latter may be slid laterally on the frame 12 and removed, as shown in dotted lines in Figs. 1 and 2.

Each set of cutting devices is mounted in a block 23 which preferably fits into a recess formed in the adjacent supporting member 18 and removably secured therein by screws 23a. Each block 23 is formed with a plurality of through recesses 24, one for each cutting device or tool 12', arranged parallel to each other at an inclined angle to the direction of feed of the stock A. The rear end portion of each recess 24 is enlarged and threaded to take an externally threaded nut 25 which forms a support for a screw 26. The inner end of the screw 26 forms an abutment for the rear end of the adjacent cutting device 12', the adjustment endwise of the screw determining the position of the cutting edge of the cutting device relative to the adjacent side edge of the stock A. One side wall of the recess 24 is inclined downwardly and inwardly so that a wedge 27, interposed between this inclined wall and the cutting device and forced downwardly by screws 27a, will rigidly secure the device to the walls of the recess 24. By removal of the block 23 and the screws 27a, and wedge 27, for each cutting device 12', the latter may be removed through the outer end of the recess 24; and upon removal of the pin 26 and nut 25, the cutting device may be removed through the inner end of the recess 24.

The cutting devices 12' of each set are arranged so that their cutting edges remove a limited amount of metal of the stock, each of the rearward tool edges being positioned inwardly of the adjacent forward tool edge so that the edges progressively engage the edge of the stock. The devices 12' are adjustably positioned so that each removes approximately the same amount of metal from the stock as the latter feeds forwardly.

28, 28a, indicate pairs of rollers disposed forwardly and rearwardly of the sets of tools and engaging the opposite side edges of the stock A, such engagement serving to move the frame 12 laterally on the rollers 15 due to any camber existing in the stock, whereby the sets of cutting devices follow the stock and maintain their operative relation with the side edges thereof. The rollers 28 are mounted on the frame 12, as later set forth, whereas the rollers 28a are mounted on the supporting members 18. The rollers 28, 28a are loosely mounted on vertically disposed stud shafts 29, 29a, respectively, the lower ends of shafts 29a being fixedly mounted in recesses formed in the walls of the members 18 by screws 30 extending through the bottoms of the members as shown in dotted lines in Fig. 4, whereby the rollers 28a have a fixed spaced relation dependent upon the width of the stock; whereas the lower ends of the shafts 29 are similarly mounted in slide blocks 31 (see Fig. 6), which are operatively connected together for simultaneous movement toward or away from each other to form an equalizing means for the stock, so that if the width of the stock varies, the rollers will guide it centrally to the tools 12' to insure that an equal amount of metal will be cut or planed off from both edges of the metal. The slide blocks 31 are mounted between ways 32 suitably fixed to the frame 12 for movement transversely to the direction of feed of the stock and connected at their inner ends to bars 33 by screws 34, the inner ends of the bars 33 having a side by side relation and provided on their opposed sides with ratchet teeth 33a in mesh with a pinion 35, which rotates on a stud shaft 35a fixedly mounted in the frame 12. Springs 36 interposed between the rear ends of the slide blocks 31 and plates 36a fixed to the outer ends of the ways 32 normally tend to move the blocks 31 toward each other. Each of the bars 33 is formed with a plurality of threaded openings to receive the threaded end of the adjacent screw 34, whereby the blocks may be spaced different distances dependent upon the width of the stock A.

The frame 12 is preferably formed with a recess 12x to slidably receive the bars 33.

Stock engaging devices 37 are preferably provided above and below the stock A in one or more transverse planes cutting the tools 12', and arranged to maintain the stock in a plane and prevent buckling thereof due to the pressure of the tools 12'. These devices, for illustrative purposes, consist of a plurality of rolls 38 adjustably fixed to a lower shaft 38a and a plurality of rolls 39 adjustably fixed to an upper shaft 39a. The lower shaft 38a may be mounted in bearings 40 provided on the frame 12, whereas the upper shaft 39a may be mounted in bearing boxes 40a mounted in the bridge members 21 and adjustable vertically by means of screws 4a' which extend through screw threaded openings formed in plates 21a suitably bolted on top of the bridge members 21 (see Figs. 3 and 4). As shown, I provide two pairs of shafts 38a, 39a and mount rolls 38, 39, thereon. Each roll 38, 39, is adjustably fixed to the adjacent shaft by a countersunk set screw 42, but each roll may be formed in sections and suitably secured to the shaft. Each roll on each upper shaft 39a is alined with a roll of the adjacent lower shaft 38a and each two alined rolls may be spaced any desired distance from the adjoining alined rolls.

The frame 12 is cut away, as shown at 12x', to accommodate the shafts 38a and rolls 38 thereon.

The frame 12 has a width so as to support at one side (preferably that side adjacent the driving means) tool supporting members 18 of different dimensions; that is, members 18 which vary in length transversely to the direction of feed of the stock so that the set of tools on each selected member may be spaced from the set of tools on the other supporting member 18 according to the width of the stock to be operated upon. For the same purpose the shafts 38a, 39a, are extended, as shown in Fig. 5 and provided with an adequate number of rolls 38, 39, for the maximum stock width, whereby these rolls may be suitably spaced without disassembly. Accordingly, where the stock to be operated upon has a different width, it is only necessary to replace one supporting member on the frame 12.

As shown in Fig. 12, the edges of the sets of tools 12' are related to the rolls 28, 28a and the edges of each set of tools are disposed in stepped relation so that each may remove or plane off from the stock edge a predetermined amount of metal, as clearly shown in Fig. 12. Each tool 12' of one set is alined in opposed relation to the corresponding tool of the other set. The adjustable abutment 26 permits the tools to be adjusted endwise to set their edges in any desired stepped relation, as well as to permit any thereof to be positioned out of engagement with the stock.

In Fig. 7, the tool edge is shaped to plane the stock edge in a plane at right angles to the faces thereof, whereas the tool edge shown in Fig. 9 is shaped to plane the stock edge on an inclined plane.

To those skilled in the art to which my invention relates, many changes in construction and widely differing embodiments and applications of the invention will suggest themselves without departing from the spirit and scope of my invention. The disclosures and the description herein are purely illustrative and are not intended to be in any sense limiting.

What I claim is:

1. In a machine of the class described, the combination with a support, of a frame mounted thereon for movement freely laterally in opposite directions, means for feeding sheet stock over said frame, pairs of guides mounted on said frame for engaging the opposite side edges of the stock during feeding thereof and arranged to co-act with the side edges due to camber in the stock to move said frame laterally, and spaced cutting tools mounted on said frame for removing metal from the side edges of the stock during feeding thereof.

2. A machine as claimed in claim 1 wherein the guides of one pair thereof are mounted to transversely slide on said frame and said guides are connected together for movement simultaneously toward or away from each other and springs operatively connected to said guides normally tend to move them toward each other.

3. In a machine of the class described, the combination with a support, of a frame, means for feeding sheet stock over said frame, means between said frame and said support for supporting the frame on the latter and permitting the frame to move freely laterally in opposite directions relative to the direction of feed of the stock due to camber therein, spaced cutting tools on said frame arranged to engage with and remove metal from the opposite side edges of the stock, a pair of spaced guides on said frame rearward of said tools for engaging the opposite side edges of the stock, and connected together relatively movable devices slidably mounted on said frame forward of said tools for engaging the opposite side edges of the stock for guiding the stock to said tools.

4. A machine as claimed in claim 3, wherein said devices comprise a pair of rolls engaging the opposite edges of the stock, connections between the rolls arranged to move them simultaneously away from or toward each other and spring means normally tending to move said rolls toward each other.

5. A machine as claimed in claim 1, wherein is provided a set of tools for engagement with each side edge of the stock, the edges of each set of tools being in stepped relation.

6. A machine as claimed in claim 1, wherein each tool is mounted on a supporting member removably mounted on said frame.

7. A machine as claimed in claim 1, wherein the frame is provided with removable supporting members and each tool is mounted on one of said members and said guides are mounted on said supporting members and said frame, respectively.

8. In a machine of the class described, the combination with a support, of a frame, means for feeding sheet stock over said frame, means between said frame and said support for supporting the frame on the latter and permitting it to move freely laterally in opposite directions relative to the feed of the stock, pairs of guides mounted on said frame for engaging the opposite edges of the stock and arranged to co-act therewith to move said frame laterally due to camber therein, a member mounted on said frame at each side of the stock, a block mounted on each said member and formed with a through opening, means for detachably supporting a tool in said opening, and adjustable abutment means carried by the block for engaging the rear end of the tool.

9. In a machine of the class described, the combination with a support, of a frame, means for feeding sheet stock over said frame, means between said frame and said upport for supporting the frame on the latter and permitting it to move freely laterally in opposite directions relative to the feed of the stock, a member mounted on said frame at each side of the stock, front and rear pairs of guides mounted on said frame and adapted to engage the opposite edges of the stock and arranged to co-act therewith to move said frame laterally due to camber therein, a block removably mounted on each said member intermediate the adjacent front and rear guides and formed with a plurality of through openings, each arranged to receive a tool, means for detachably supporting a tool in each of said openings, and adjustable abutment means carried by the block for engaging the rear end of each tool.

10. A machine as claimed in claim 1, wherein is provided a pair of shafts disposed transversely to the direction of feed of the stock substantially in the plane of the tools and above and below the plane of movement of the stock and supported on said frame at opposite sides thereof and a pair of alined rolls on said shafts arranged to engage the opposite faces of the stock, one of said shafts being adjustable perpendicularly relative to the stock.

11. In a machine of the class described, the combination with a support, of a frame, means for feeding sheet stock over said frame, means between said frame and said support for supporting the frame thereon and permitting it to move freely laterally in opposite directions relative to the feed of the stock, a member mounted on said frame at each side of the stock and arranged to support a set of tools in spaced relation to the set of tools supported by the other member for engagement with the stock side edges, pairs of rollers mounted on said frame forwardly and rearwardly of the sets of tools thereon and engaging the opposite edges of the stock and arranged to co-act therewith to move said frame laterally due to camber therein, the forward pair of rollers being mounted for movement transversely to the direction of feed of the stock, and spring means normally tending to move said forward pair of rollers toward each other.

12. In a machine of the class described, the combination with a support, of a frame, means for feeding sheet stock over said frame, means between said frame and said support for supporting the frame thereon and permitting it to move freely laterally in opposite directions relative to the feed of the stock due to camber therein, a member mounted on said frame at each side of the stock, a pair of rollers mounted on said frame in fixed spaced relation for engagement with the opposite side edges of the stock, tools carried by said members forwardly of said rollers in predetermined fixed relation thereto for engaging with and removing metal from the side edges of the stock, and guide means for the stock on said frame forwardly of said tools.

13. In a machine of the class described, the combination with a support, of a frame mounted thereon for movement freely laterally in opposite directions, means for feeding sheet stock over said frame, spaced cutting tools mounted on said frame for removing metal from the edges of the stock during feeding thereof, and a pair of guides mounted on said frame forward of said tools for engaging the opposite side edges of the stock and co-act therewith due to camber in the stock to move said frame laterally.

14. In a machine of the class described, the combination with a support, of a frame mounted thereon for movement freely laterally in opposite directions, means for feeding sheet stock over said frame, front and rear pairs of guides mounted on said frame for engaging the opposite side edges of the stock and co-act therewith due to camber in the stock to move said frame laterally, and spaced cutting tools mounted on said frame intermediate said pairs of guides for removing metal from the edges of the stock during feeding thereof.

15. A machine as claimed in claim 1 wherein means are provided for engaging the opposite faces of the stock between said tools.

16. An edge trimmer for strip material of the class described including cutting tools adapted to engage opposite edges of a strip moving therebetween, a base, supports for said tools removably mounted on said base, strip supporting means positioned to engage the top and bottom surfaces of the strip adjacent said tools, edge guides positioned to engage the opposite edges of said strip, certain of said guides being spring operated to provide resilient engagement thereof with the strip edges, and means for removably securing said tool supports on said base with the tools thereon in operative relation to the edges of the strip.

17. A machine as claimed in claim 1, wherein means are provided between the tools for supporting the stock during feeding thereof.

18. A machine as claimed in claim 1, wherein rolls are provided between the tools for engaging the opposite faces of the stock during feeding thereof.

19. In a machine of the class described, the combination with a support, of a frame mounted thereon for movement laterally in opposite directions, means for feeding stock over said frame, spaced cutting tools mounted on said frame for removing metal from the opposite side edges of the stock during feeding thereof, a pair of spaced devices fixedly carried by said frame rearward of said tools for engaging the opposite side edges of the stock, a pair of spaced devices slidably mounted on said frame forward of said tools for relative movement transverse to the feed of the stock for engaging the opposite side edges thereof, and means normally tending to move said last mentioned devices toward each other.

CARL M. YODER.